United States Patent
Liao et al.

(10) Patent No.: US 8,620,050 B2
(45) Date of Patent: Dec. 31, 2013

(54) SYSTEM AND METHOD FOR 2-D/3-D REGISTRATION BETWEEN 3-D VOLUME AND 2-D ANGIOGRAPHY

(75) Inventors: Rui Liao, Princeton Junction, NJ (US); Shun Miao, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 95 days.

(21) Appl. No.: 13/222,034

(22) Filed: Aug. 31, 2011

(65) Prior Publication Data
US 2012/0163686 A1   Jun. 28, 2012

Related U.S. Application Data

(60) Provisional application No. 61/385,597, filed on Sep. 23, 2010.

(51) Int. Cl.
*G06K 9/00*   (2006.01)

(52) U.S. Cl.
USPC .......................................................... 382/130

(58) Field of Classification Search
None
See application file for complete search history.

(56) References Cited

U.S. PATENT DOCUMENTS

| | | | |
|---|---|---|---|
| 2009/0175562 A1* | 7/2009 | Pan et al. ...................... | 382/312 |
| 2009/0208078 A1* | 8/2009 | Fritz et al. .................... | 382/130 |
| 2010/0191541 A1* | 7/2010 | Prokoski ........................... | 705/2 |
| 2011/0096969 A1* | 4/2011 | Zheng et al. .................. | 382/131 |
| 2011/0222750 A1* | 9/2011 | Liao et al. ..................... | 382/131 |

OTHER PUBLICATIONS

Miao et al. "A hybrid method for 2-D/3-D registration between 3-D volumes and 2-D angiography for trans-catheter aortic valve implantation (TAVI)". 2011 IEEE International Symposium on Biomedical Imaging: From Nano to Macro, Date of Conference: Mar. 30, 2011-Apr. 2, 2011. Available online: http://ieeexplore.ieee.org/xpls/abs_all.jsp?arnumber=587262.*

Yefeng Zheng, et al. "Automatic Aorta Segmentation and Valve Landmark Detection in C-Arm CT: Application to Aortic Valve Implantation,", MICCAI, 2010.

Matthias John, et al., "System and Guide Transcatheter Aortic Valve Implantations Based on Interventional C-Arm CT Imaging," MICCAI, 2010.

* cited by examiner

*Primary Examiner* — Andrew W Johns
*Assistant Examiner* — Tahmina Ansari
(74) *Attorney, Agent, or Firm* — Donald B. Paschburg; F. Chau & Associates, LLC

(57) ABSTRACT

A method for registering a 2-D DSA image to a 3-D image volume includes calculating a coarse similarity measure between a 2-D DRR of an aorta and a cardiac DSA image, and a 2-D DRR of a coronary artery and the cardiac DSA image, for a plurality of poses over a range of 2-D translations. Several DRR-pose combinations with largest similarity measures are selected as refinement candidates. The similarity measure is calculated between the refinement candidate DRRs and the DSA, for a plurality of poses over a range of 3-D translations and in-plane rotations. One or more DRR-pose combinations with largest similarity measures are selected as final candidates. The similarity measure between the final candidate DRRs the DSA are calculated for a plurality of poses over a range of 3D translations and 3D rotations, and a DRR-pose combination with a largest similarity measure is selected as a final registration result.

22 Claims, 6 Drawing Sheets

Figure 8
| # | Hinge Plane Distance | | Ostia Distance | | Average Distance | |
|---|---|---|---|---|---|---|
| | Proposed | Conv. | Proposed | Conv. | Proposed | Conv. |
| 1 | 1.38 | 39.41 | 4.04 | 46.08 | 2.51 | 42.75 |
| 2 | 2.64 | 2.37 | 0.37 | 0.33 | 1.51 | 1.35 |
| 3 | 1.41 | 9.21 | 2.84 | 140.67 | 2.13 | 74.94 |
| 4 | 3.64 | 3.75 | 0.66 | 1.66 | 2.15 | 2.71 |
| 5 | 0.12 | 36.03 | 2.53 | 77.93 | 1.33 | 56.98 |
| 6 | 0.57 | 1.04 | 3.40 | 3.38 | 1.98 | 2.21 |
| 7 | 1.61 | 1.40 | 2.86 | 1.86 | 2.24 | 1.63 |
| 8 | 1.28 | 106.48 | 3.97 | 104.90 | 2.63 | 105.69 |
| 9 | 1.74 | 3.22 | 3.84 | 7.78 | 2.79 | 5.50 |
| Average | 1.59 ±1.05 | 22.32 ±34.89 | 2.83 ±1.50 | 42.73 ±53.19 | 2.14 ±0.49 | 32.64 ±39.24 |
Figure 9
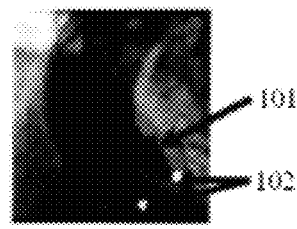
Figure 10

SYSTEM AND METHOD FOR 2-D/3-D REGISTRATION BETWEEN 3-D VOLUME AND 2-D ANGIOGRAPHY

CROSS REFERENCE TO RELATED UNITED STATES APPLICATIONS

This application claims priority from "A Hybrid Method for 2-D/3-D Registration between 3-D volume and 2-D Angiography with Applications on Trans-catheter Aortic Valve Implantation", U.S. Provisional Application No. 61/385,597 of Liao, et al., filed Sep. 23, 2010, the contents of which are herein incorporated by reference in their entirety.

TECHNICAL FIELD

This disclosure is directed to methods for 2-dimension (2-D)/3-dimension (3-D) registration between 3-D image volumes and 2-D angiography images with applications to trans-catheter aortic valve implantation (TAVI).

DISCUSSION OF THE RELATED ART

Aortic valve disease affect about 1.8% of the global population, and is the most frequent heart valve disease in developed countries, leading to 60,000 surgical aortic valve replacements every year in Europe and even more in the United States. Trans-catheter aortic valve implantation (TAVI) is a new and breakthrough minimally invasive alternative to open heart surgery in patients with severe aortic stenosis. During trans-apical TAVI, an antegrade access is used in which a catheter and prosthesis are inserted via small incisions in the chest and the apex of the heart. During transfemoral TAVI, the catheter is inserted retrogradely via the femoral artery and the aortic arch. Both approaches require X-ray angiographic and fluoroscopic imaging to guide the procedure.

Recently, 3-D models have been introduced to support TAVI procedures by overlaying a 3-D aortic model onto a 2-D fluoroscopy image to provide anatomical details and more accurate C-ARM angulation for optimal valve deployment. Accurate overlay of 3-D models onto the fluoroscopy images requires 2-D/3-D registration between the 3-D model and the 2-D fluoroscopy images, which could be achieved by matching the 3-D model to the angiography with contrast injection showing the aortic root.

Techniques for 2-D/3-D registration between the 3-D volumes and 2-D X-ray images can be divided into two general groups: landmark/feature-based methods and intensity-based methods. Landmark/feature-based methods register landmarks and/or salient features that have been extracted automatically or semi-manually from both the 2-D image and the 3-D volume. While this approach has a fast execution time and exhibits high robustness in the face of large mis-registrations, it is challenging to achieve full automation, especially for salient feature extraction from 2-D X-ray images that inherently suffer from a low signal-to-noise ratio (SNR) and overlapping and/or foreshortening due to 2-D projections. For intensity based registration algorithms, simulated 2-D X-Ray images, known as digitally reconstructed radiographs (DRRs), are produced from the 3-D volume at a particular pose. The translation and rotation of the 3-D volume are estimated through an optimal match between the DRRs and the X-ray image. While intensity-based methods have been shown to yield substantially more reliable results than their feature-based counterparts, their accuracy may be sub-optimal at the structure of interest, and their performance seriously deteriorates when there is mismatch between the contents shown in the 2-D and 3-D data.

SUMMARY

Exemplary embodiments of the invention as described herein generally include methods and systems that incorporate segmentation and landmark information of the 3-D aortic root into intensity-based registration for highly accurate and robust 2-D/3-D alignment of the aorta. Both the 3-D volume and the 2-D images are captured with contrast injection showing patient's aortic root, as shown in FIGS. 1(a) and (c). 2-D angiographic images are first preprocessed to remove the background and/or devices such as a catheter and a transesophageal echocardiography (TEE) probe. 3-D aorta segmentation and coronary ostia landmark detection is performed on the 3-D volume, and the aorta segmentation is then used to produce clean DRR images that show only the aorta and exclude all the peripheral structures such as the spine. Landmarks representing the left and right coronary ostia are further utilized in an integrated fashion with the intensity-based method. A multi-stage and multi-resolution optimization strategy is finally deployed to find the optimal registration.

A 2-D/3-D registration according to an embodiment of the invention can be extended from a single frame to the whole fluoroscopy sequence, potentially with incorporated temporal constraints. The registration to fluoroscopy sequence can be used for motion compensation. In addition, a 2-D/3-D registration according to an embodiment of the invention currently uses two landmarks, left and right coronary ostias, to help the registration. Other aortic landmarks, such as the three lowest points of cusps and three commissures, can also be analyzed and utilized for registration. A 2-D/3-D registration according to an embodiment of the invention is of general form and can be applied to registration of other organs and in other applications.

According to an aspect of the invention, there is provided a method for registering a 2-dimension (2-D) digital subtraction angiography (DSA) image to a 3-dimension (3-D) image volume during a cardiac procedure, the method including calculating a coarse similarity measure between a 2-D digitally reconstructed radiograph (DRR) of an aorta and a cardiac DSA image, and a 2-D DRR of a coronary artery and the cardiac DSA image, for a plurality of poses over a range of 2-D translations, selecting one or more DRR-pose combinations for the aorta and the coronary artery with largest similarity measures as refinement candidates, calculating the similarity measure between the refinement candidate DRRs of the aorta and the DSA, and between the refinement candidate DRRs of the coronary artery and the DSA, for a plurality of poses over a range of 3-D translations and in-plane rotations, selecting one or more DRR-pose combinations for the aorta and the coronary artery with largest similarity measures as final candidates, calculating the similarity measure between the final candidate DRRs of the aorta and the DSA, and between the final candidate DRRs of the coronary artery and the DSA, for a plurality of poses over a range of 3D translations and 3D rotations, and selecting a DRR-pose combination with a largest similarity measure as a final registration result.

According to a further aspect of the invention, the method includes pre-processing the DSA image to subtract a background image, apply morphological operations, and remove artifacts of the morphological operations.

According to a further aspect of the invention, the 2-D DRR of an aorta and the 2-D DRR of a coronary artery are generated from a same 3-D cardiac image volume.

According to a further aspect of the invention, the method includes pre-processing the 3-D cardiac image volume to create 3-D image masks for the aorta and the coronary artery, where the image masks are used to generate the 2-D DRR of the aorta and the 2-D DRR of the coronary artery.

According to a further aspect of the invention, the 2-D DRR of an aorta and the 2-D DRR of a coronary artery are generated for a plurality of poses at a plurality of depths in the 3-D cardiac image volume.

According to a further aspect of the invention, the 2-D DRR of an aorta and the 2-D DRR of a coronary artery are centered about an estimated center of the aortic root.

According to a further aspect of the invention, the coarse similarity measure is calculated between a downsampled 2-D DRR of the aorta, a downsampled 2-D DRR of the coronary artery, and a downsampled cardiac DSA image.

According to a further aspect of the invention, the similarity measure is defined by $SM = GC_{Aorta}(I_{Aorta}, I_{DSA}, M_{Aorta}) + \beta \cdot GC_{Coronary}(I_{Coronary}, I_{DSA}, M_{Coronary})$, where $I_{Aorta}$ represents the aortic DRR image, $I_{Coronary}$ represents the coronary artery DRR image, $I_{DSA}$ represents the 2-D DSA image, $M_{Aorta}$ represents a 2-D aorta image mask defined as $$M_{Aorta} = \begin{cases} 1, & \text{if } |\nabla I_{Aorta}| > \alpha, \\ 0, & \text{otherwise}, \end{cases}$$

where $\alpha$ is a threshold of the image gradient, $M_{Coronary}$ represents a 2-D coronary artery image mask defined as $$M_{Coronary} = \begin{cases} 1, & \text{if } \min(|\nabla I_{Coronary}|, |\nabla I_{DRR}|) > \alpha, \\ 0, & \text{otherwise}, \end{cases}$$

$\beta$ is a heuristically determined weight for coronary ostia landmark features, GC is a gradient correlation between images $I_1$ and $I_2$ with image mask M defined as $$GC(I_1, I_2, M) = NCC\left(\frac{\partial I_1}{\partial x}, \frac{\partial I_2}{\partial x}, M\right) + NCC\left(\frac{\partial I_1}{\partial y}, \frac{\partial I_2}{\partial y}, M\right),$$

and NCC denotes the normalized cross correlation of the masked images defined as $$NCC(I_1, I_2, M) = \frac{\sum_{M(x,y)=1} |I_1(x,y) - \bar{I}_1(x,y)||I_2(x,y) - \bar{I}_2(x,y)|}{\sqrt{\left(\sum_{M(x,y)=1} |I_1(x,y) - \bar{I}_1(x,y)||I_2(x,y) - \bar{I}_2(x,y)|\right)^2}},$$

where $\bar{I}$ denotes the average intensity of pixels in the masked region of the image.

According to a further aspect of the invention, pre-processing the 3-D cardiac image volume to create 3-D image masks for the aorta includes segmenting the aorta in the 3-D cardiac image volume, and defining the aortic mask by $$VM_{aorta}(x, y, z) = \begin{cases} 1, & \text{if } (x, y, z) \in \text{aorta}, \\ 0, & \text{otherwise}. \end{cases}$$

According to a further aspect of the invention, pre-processing the 3-D cardiac image volume to create 3-D image masks for the coronary artery includes detecting left and right coronary ostia in the 3-D cardiac image volume, centering two spherical masks $VM_l$ and $VM_r$ around the detected coronary ostia, forming a mask $VM_{out}$ from the union of $VM_l$ and $VM_r$, excluding an area inside $VM_{aorta}$, and calculating an intensity distribution for voxels in the mask $VM_{out}$, and choosing a lower bound of a 3-D volume transfer window associated with the coronary artery image mask as a given percentile of the intensity distribution, and an upper bound of the 3-D volume transfer window to be a highest voxel intensity of the volume.

According to another aspect of the invention, there is provided a program storage device readable by a computer, tangibly embodying a program of instructions executable by the computer to perform the method steps for registering a 2-dimension (2-D) digital subtraction angiography (DSA) image to a 3-dimension (3-D) image volume during a cardiac procedure.

BRIEF DESCRIPTION OF THE DRAWINGS

FIG. 8 shows examples of registration results, according to an embodiment of the invention.

FIG. 9 is a table that compares results of a conventional 2-D/3-D registration method with a registration method according to an embodiment of the invention.

FIG. 10 shows the left coronary ostia and the left and right hinge points, according to an embodiment of the invention.

DETAILED DESCRIPTION OF EXEMPLARY EMBODIMENTS

Figure 1:
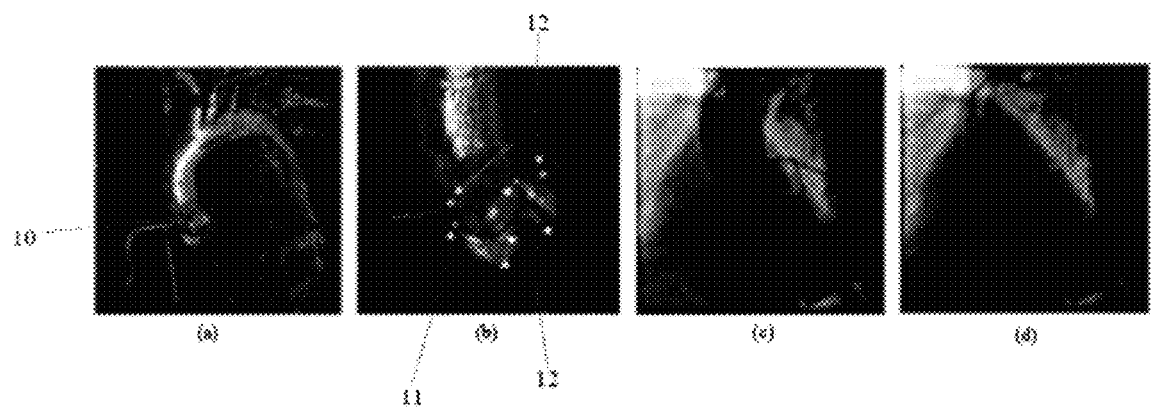
FIGS. 1(a)-(d) illustrate a 3-D volume and 2-D angiography of a patient's aorta, according to an embodiment of the invention.

Exemplary embodiments of the invention as described herein generally include systems and methods for 2-dimension (2-D)/3-dimension (3-D) registration between 3-D image volumes and 2-D angiography images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Exemplary embodiments of the invention provide methods for accurate alignment of the aortic root between a 3-D volume and 2-D fluoroscopy and/or angiography images. Both the 3-D volume and the 2-D images may be captured with contrast injection showing patient's aortic root, as shown in FIGS. 1(a) and (c) respectively, with the aorta 10 labeled in FIG. 1(a). For comparison purposes, FIG. 1(d) depicts a patient's aortic root without a contrast agent. Before the registration, 3-D aorta segmentation and landmark detection is performed on the 3-D volume to obtain 3-D aortic mask and landmarks as shown in FIG. 1(b). FIG. 1(b) shows the coronary ostia 13, the commissures 11, and the three lowest cusp points 12. The aortic segmentation mask is used in the DRR generator to produce clean DRR images that show only the aorta and excludes all the peripheral structures such as the spine. The coronary arteries are not explicitly segmented due to their relatively high geometrical variation across patients. Landmarks representing the left and right coronary ostia are detected, which are further utilized in a registration algorithm integrated with an intensity-based method according to embodiments of the invention. 2-D angiographic images are pre-processed to remove the background and/or devices such as the catheter and a TEE probe. A multi-layer and multi-resolution optimization strategy is used to find the optimal registration.

2-D Image Processing

Intra-operative X-ray fluoroscopy images usually contain devices and/or structures that are not present in the pre-operative 3-D volume, such as the catheter and TEE probe. To remove these irrelevant structures and enhance the aorta, digitally subtracted image SI is calculated as:

$$SI = I - BI \quad (1)$$

where I is a 2-D aortic angiography image, and BI is a background image that could be obtained by enforcing a short period of image acquisition without contrast injection.

Due to cardiac and/or respiratory motion, there could be visible ghost artifacts in the digitally subtracted image SI. These ghost artifacts typically have high gradients and hence can negatively affect the accuracy of a registration algorithm according to an embodiment of the invention, which utilizes a gradient-based similarity measure for registration. These high-gradient ghost artifacts can be removed by utilizing the fact that motion at the aorta between the background image and the aortic angiography image is usually relatively small so that the ghost artifacts typically are spatially much smaller than the aorta. Hence grayscale morphological closing and opening operations are performed with an appropriate size kernel on the digitally subtracted image to remove the small structures and retain large structures, such as the aorta:

$$MI = SI \bullet SE1 \circ SE2 \quad (2)$$

where '•' and '∘' symbol respectively denote the morphological closing and opening operations. The closing operation eliminates small dark objects and the opening operation eliminates small bright objects. When they are performed sequentially, the ghost artifacts can be substantially eliminated. SE1 and SE2 are structure elements. Exemplary, non-limiting structure elements are chosen to be disks having a radius of 3 and 6 respectively. Lastly, a filter is applied to MI for smoothing to mitigate artifacts produced by morphological filtering. An exemplary, non-limiting filter is a Gaussian filter.

Figure 2:
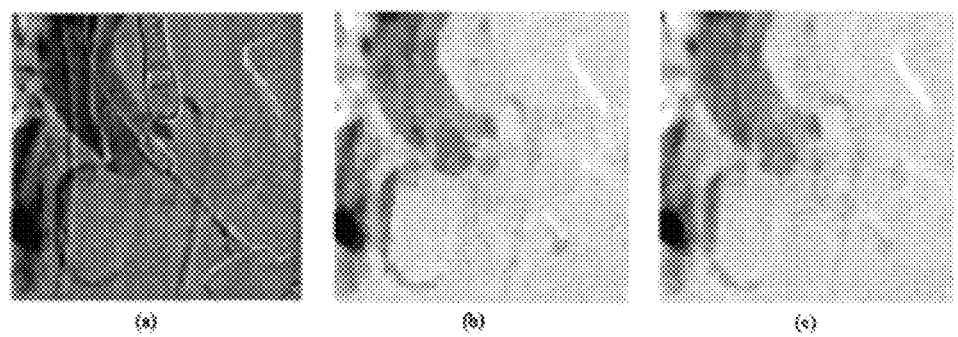
FIGS. 2(a)-(c) illustrate a comparison of 2-D fluoroscopy images before and after image processing, according to an embodiment of the invention.

FIGS. 2(a)-(c) illustrate the processing of the 2D fluoroscopy images. FIG. 2(a) depicts a digitally subtracted fluoroscopy image of an aortic angiography (DSA) before morphological filtering, FIG. 2(b) depicts a DSA image after morphological filtering, and FIG. 2(c) depicts the DSA image after Gaussian filtering.

3-D Volume Processing & DRR Generation

Figure 3:
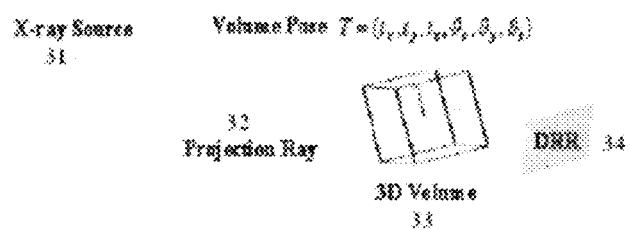
FIG. 3 illustrates the generation of a DRR, according to an embodiment of the invention.

The transformation relating points in the 3-D volume to points on the projected 2-D X-ray image comprises six extrinsic rigid-body parameters that are estimated by an iterative registration algorithm according to an embodiment of the invention, and four intrinsic perspective projection parameters that are determined by the X-ray imaging system based on a pinhole camera model as depicted in FIG. 3, which shows an X-ray source 31 emitting projection rays 32 into a 3D volume 33 with pose $T=(t_x, t_y, t_z, \theta_x, \theta_y, \theta_z)$ to produce DRR 34. DRRs can be generated using a 3-D texture-based volume rendering technique on a graphics processing unit (GPU), which yields better computational efficiency than software-based technique such as ray-casting. It takes about 15 ms to generate 256×256 DRRs from a 256×256×256 volume with an NVidia Quadro FX 360M GPU. Prior to generating the DRRs, the 3-D CT image volume is preprocessed to create an image mask for the aorta and an image mask for the coronary artery.

Aorta Rendering

Figure 5:
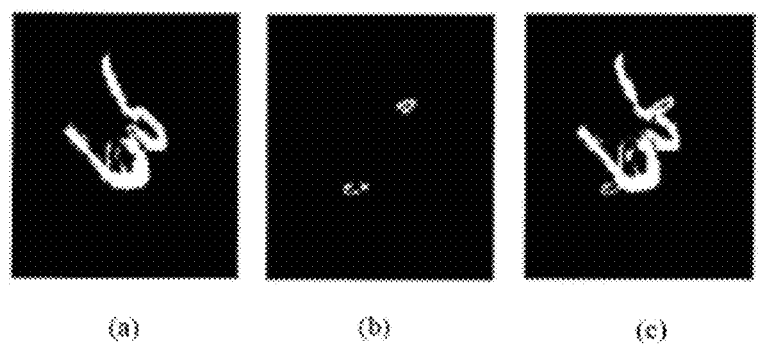
FIGS. 5(a)-(c) depict registration masks, according to an embodiment of the invention.

Given a 3-D volume with translation and rotation parameters, DRR images are rendered for intensity-based registration. DRR images rendered for the entire volume tend to include occlusions and irrelevant structures, which makes some important landmarks such as coronary ostia faint or even invisible. To obtain clean DRR images, the 3-D CT volume is pre-processed to segment the aorta. The aorta is usually divided into the aortic root and 5 segments: (1) ascending aorta, (2) arch of aorta, (3) descending aorta, (4) thoracic aorta and (5) abdominal aorta. As alignment concerns aortic valve implantation, only aortic root and ascending aorta are typically imaged and then segmented for registration. The aortic mask is a binary 3-D volume denoted as:

$$VM_{aorta}(x, y, z) = \begin{cases} 1, & \text{if } (x, y, z) \in \text{aorta} \\ 0, & \text{otherwise,} \end{cases} \quad (3)$$

where VM is the segmentation mask. The mask for the aorta is shown in FIG. 5(a).

The rendered DRR image may have a different intensity range due to the different volume size and resolution. An appropriate transparency is selected to map the rendered DRR image back to [0-255] intensity range to maximize the dynamic range while eliminating saturation.

Figure 4:
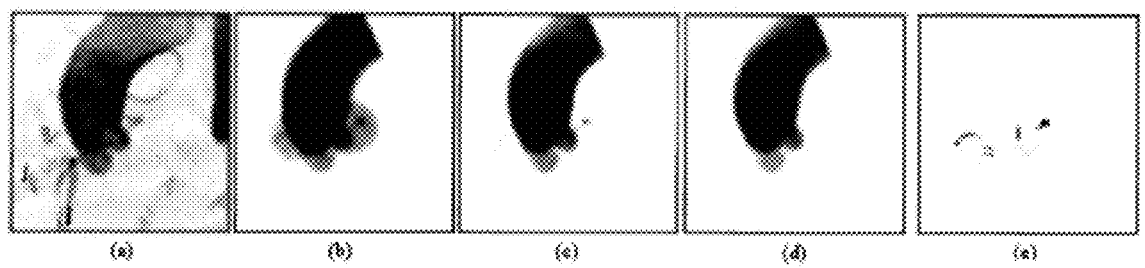
FIGS. 4(a)-(e) illustrate 3-D volume processing and DRR generation, according to an embodiment of the invention.

FIGS. 4(a)-(e) illustrate 3-D volume processing and DRR generation. FIG. 4(a) depicts a DRR image generated from the original 3-D volume. FIG. 4(b) depicts a DRR image generated by combining the aorta and coronary ostia with default rendering parameters. FIG. 4(c) depicts a DRR image combining the aorta and the coronary ostia, with the automatically selected rendering parameters. FIG. 4(d) depicts a DRR image of the segmented aorta. FIG. 4(e) depicts a DRR image of the coronary ostia/artery. The DRR image for the segmented aorta, denoted by $I_A$, is shown in FIG. 4(d), is significantly enhanced compared to the aorta shown in FIG. 4(a). Note that due to the segmentation complexity, the aortic leaflets are not explicitly segmented. Instead, the segmentation mask includes a sequence of circular cross section contours perpendicular to the aortic centerline and with estimated radii. However, because the aortic root is filled with contrast agent, the shape of the leaflets is clearly visible in the generated DRRs. In addition, an explicit aorta segmentation of the 2-D image is not needed.

Coronary Artery Rendering

Landmarks at the left and right coronary ostia may be detected in the 3-D volume. Conventional landmark-based registration algorithm requires that the corresponding landmarks also be detected in the 2-D X-ray image, which is a challenging task and typically requires user interaction. Furthermore, it requires that the accuracy of the landmark position to be relatively high on both the 3-D volume and 2-D images. In a hybrid registration algorithm according to an embodiment of the invention, the detected landmarks are used as facilitating anchor points for registration, without the need of explicitly detecting the corresponding landmarks on the 2-D images. In particular, since the coronary arteries are filled with the contrast agent and hence visible in both 3-D volume and 2-D X-ray images, the detected landmarks may be extended to their surrounding area, in particular, the coronary artery, by optimizing the DRR generation of a small volume around the detected ostia. The DRR image optimized for coronary artery rendering (without explicit coronary artery segmentation from the 3-D volume) is then matched to the coronary artery shown in the X-ray image using intensity-based registration.

Figure 6:
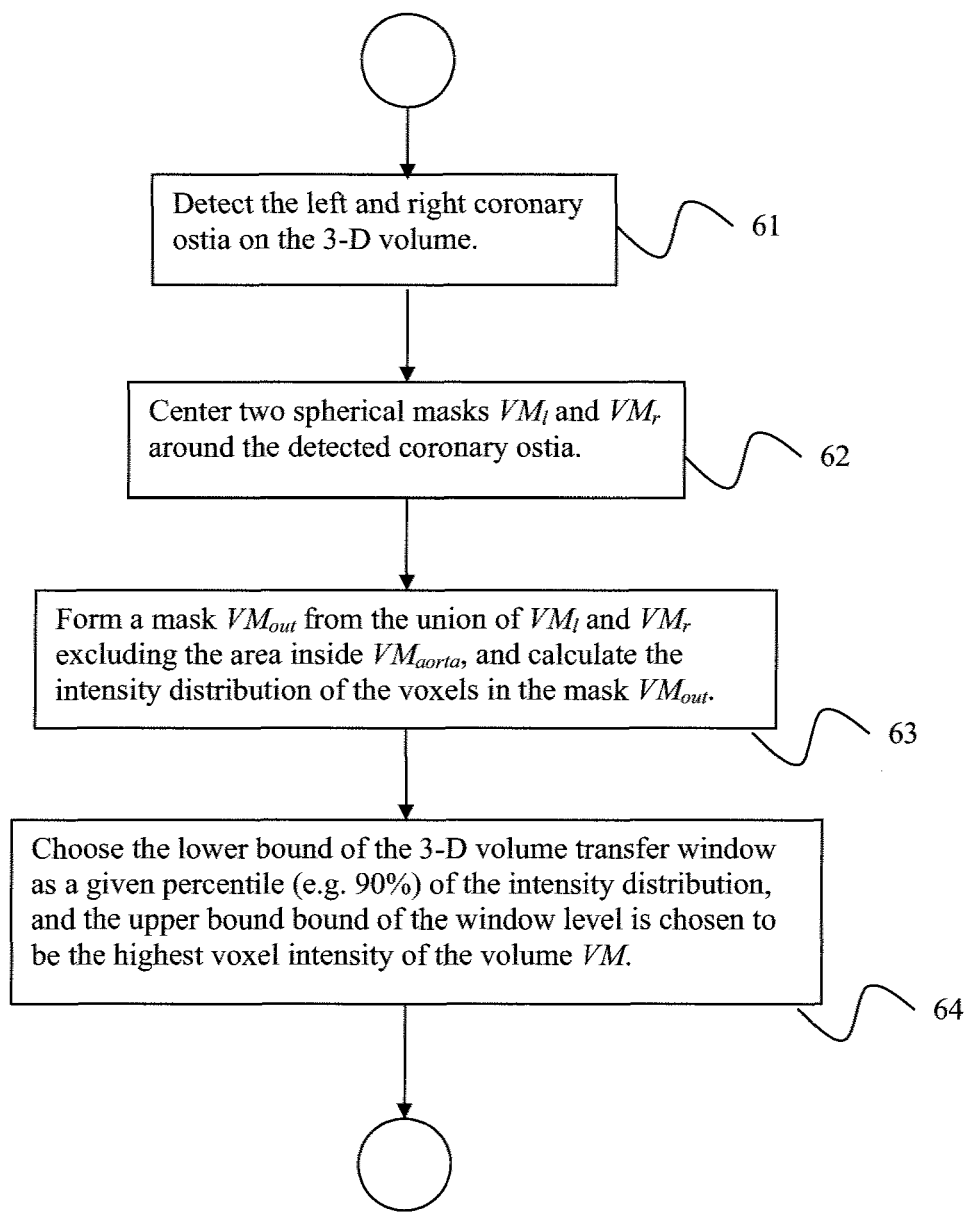
FIG. 6 is a flowchart of a method for pre-processing a 3-D CT image volume for coronary artery rendering, according to an embodiment of the invention.

A flowchart of a method according to an embodiment of the invention for pre-processing a 3-D CT image volume for coronary artery rendering is depicted in FIG. 6. Referring now to the figure, a method according to an embodiment of the invention begins at step 61 by detecting the left and right coronary ostia on the 3-D volume. Two spherical masks $VM_l$ and $VM_r$ are centered around the detected coronary ostia with a given radius, at step 62. These masks are shown in FIG. 5(b). DRR images may be generated from the two spherical masks around the left and right coronary ostia. As the spherical coronary mask also includes background, artifacts of dark disk-like region may be generated in the resulted DRR image as shown in FIG. 2(b), which will negatively affect registration accuracy. A method according to an embodiment of the invention uses the fact that voxels in the coronary arteries are typically darker (i.e., have higher intensity) than their surrounding structures due to the contrast agent, and their size relative to the spherical mask can be roughly estimated according to patients' anatomy. The 3-D volume transfer function is therefore optimized to generate an optimal DRR image showing the coronary artery only. In particular, at step 63, a mask $VM_{out}$ is formed from the union of $VM_l$ and $VM_r$ excluding the area inside $VM_{aorta}$, and the intensity histogram of the voxels in the mask $VM_{out}$ is calculated. At step 64, the lower bound of the window of the 3-D volume transfer function, denoted as $v_0$, is chosen as a given percentile (e.g. 90%) of the intensity histogram, according to the relative size of the coronary artery with respect to the sphere:

$$\int_{-\infty}^{v_0} P(v \mid VM_{out}) dv = 90\%, \quad (4)$$

were v is a voxel intensity. The upper bound of the window level is chosen to be the highest voxel intensity of the volume VM. Note that the 90% threshold for the lower bound is exemplary and non-limiting, and other percentage thresholds may be chosen in other embodiments of the invention.

The DRR image of the aorta as shown in FIG. 4(e) is denoted as $I_{Aorta}$, the DRR image of coronary artery as shown in FIG. 4(d) is denoted as $I_{Coronary}$, and the DRR image combining both the aorta and coronary artery as shown in FIG. 4(c) is denoted as $I_{DRR}$. FIG. 5(c) depicts a combined registration mask for the aorta and coronary arteries.

Similarity Measure

A similarity measure used in a proposed registration method according to an embodiment of the invention combines the information from both the aorta and the extended coronary ostia landmarks. The information from the aorta provides a robust global alignment of the aorta, while landmarks provide additional confirmation when there are multiple plausible candidate positions when using the aorta alone, which is possible when the contrast is relatively faint or partially washed out in the aorta. Multiple masks are generated around landmarks as specified above, and a score of landmark matching is computed as the similarity measure in each landmark mask. The similarity measure may be calculated as follows.

1. For the aorta, the region of interest (ROI) for the similarity measure is constrained to the region near the aorta boundary. Other areas are excluded from the similarity calculation for two reasons: (1) these areas are relatively homogenous in the DRR image, and (2) the contrast filling within the aorta in the X-ray image could be different from that in the 3-D volume so that these regions may not be reliable for similarity comparison. The mask can be computed by thresholding the gradient of the DRR image of the aorta $I_{Aorta}$:

$$M_{Aorta} = \begin{cases} 1, & \text{if } |\nabla I_{Aorta}| > \alpha, \\ 0, & \text{otherwise}, \end{cases} \quad (5)$$

where $\alpha$ is the threshold of the image gradient and the image gradient $|\nabla I_{DRR}|$ may be computed by applying a Sobel operator to $I_{Aorta}$. Note that the application of the Sobel operator is exemplary and non-limiting, and other techniques for calculating an image gradient may be used in other embodiments of the invention.

2. The landmark mask contains a region of interest around each landmark. Similarly only pixels with a high gradient value in the landmark mask are considered in the similarity measure for the coronary ostia/artery:

$$M_{Coronary} = \begin{cases} 1, & \text{if } \min(|\nabla I_{Coronary}|, |\nabla I_{DRR}|) > \alpha, \\ 0, & \text{otherwise.} \end{cases} \quad (6)$$

3. In a according to an embodiment of the invention method, a gradient correlation between images $I_1$ and $I_2$ with an image mask M is defined as:

$$GC(I_1, I_2, M) = NCC\left(\frac{\partial I_1}{\partial x}, \frac{\partial I_2}{\partial x}, M\right) + NCC\left(\frac{\partial I_1}{\partial y}, \frac{\partial I_2}{\partial y}, M\right), \quad (7)$$

where NCC denotes the normalized cross correlation of the masked images, which is defined as:

$$NCC(I_1, I_2, M) = \frac{\sum_{M(x,y)=1} |I_1(x,y) - \bar{I}_1(x,y)||I_2(x,y) - \bar{I}_2(x,y)|}{\sqrt{\left(\sum_{M(x,y)=1} |I_1(x,y) - \bar{I}_1(x,y)||I_2(x,y) - \bar{I}_2(x,y)|\right)^2}}, \quad (8)$$

where $\bar{I}$ denotes the average intensity of pixels in the masked region of the image.

4. The final similarity measure is defined as a combination of the similarity of the aorta and the similarity of the coronary mask:

$$SM = GC_{Aorta}(I_{Aorta}, I_{DSA}, M_{Aorta}) + \beta \cdot GC_{Coronary}(I_{Coronary}, I_{DSA}, M_{Coronary}) \quad (9)$$

where $\beta$ is a heuristically determined weight for the coronary ostia landmark features.

Search Strategy to A search strategy of a method according to an embodiment of the invention method includes three stages: (1) a coarse alignment stage for in-plane translation; (2) a refinement stage for translation and in-plane rotation; and (3) a final stage for rigid-body transformation. In a coarse alignment stage according to an embodiment of the invention, a global search is performed at a lower resolution for coarse alignment. In the refinement and final stage s according to embodiments of the invention, an optimizer is then applied to improve the registration until the optimal match is achieved between the DRR image and the fluoroscopy image.

In a coarse alignment stage, multiple resolutions are used in the aorta region and the coronary ostia region. The DRR image of the aorta, $I_{Aorta}$, is downsampled to 64×64. This low resolution is chosen for speed and smoothness of the similarity measure. Because the coronary mask focuses on smaller structures, to ensure an accurate match, a higher resolution is used. Therefore, a resolution of 128×128 is used for the DRR image of the coronary artery $I_{Coronary}$. The DSA image is also downsampled to correspond to the resolution of the image to which it is being compared. The downsampled resolutions disclosed herein above are exemplary and non-limiting, and those of ordinary skill will recognize that other downsampled resolutions may be used in other embodiments of the invention.

A global search according to an embodiment of the invention focuses on the estimation of in-plane translation with a few levels of fixed scaling (translation in the depth direction). Before starting the global search, the center of aortic root, which is estimated through the landmark positions, is moved to the center of the 2D DRR image. Then the similarity measure is computed over a range in both images to detect (x, y) with the maximum similarity measure. An exemplary, non-limiting range is [−20 mm, 20 mm]×[−20 mm, 20 mm], where 1 mm ~=2.0 pixels for a 64×64 resolution (this can vary across patients). The global search is performed several times at to obtain a set of points $(x_i, y_i)$ at different depths $z_i$ in the 3-D CT volume. For each depth $z_i$, a 2-D DRR is generated with the desired resolution, the gradient correlations defined by EQ. (7) are computed between (1) the aorta DRR image $I_{Aorta}$ and the DSA image $I_{DSA}$ using the aorta image mask $M_{Aorta}$, and (2) the coronary DRR image $I_{Coronary}$ and the DSA image $I_{DSA}$ using the coronary image mask $M_{Coronary}$, and the similarity is computed from the gradient correlations using EQ. (9). In one exemplary, non-limiting embodiment, $z_1 = (0.95, 1.0, 1.05)z_0$, where $z_0$ is an initial depth, to yield a set of three points $(x_1, y_1)$, $(x_2, y_2)$ and $(x_3, y_3)$. In another exemplary, non-limiting embodiment, $z_1 = (0.87, 0.93, 1.0, 1.07, 1.15)z_0$. After the coarse alignment stage, one or more of the positions obtained above is within the capture range of the optimizer with respect to an optimal registration. Therefore, an optimizer will be able to pull the registration to an optimal match between the DSA and DRR images.

In a refinement stage according to an embodiment of the invention, all images used have the same resolution of 256×256, and 4 degrees of freedom (DOF) are searched, including three translations and an in-plane rotation. To avoid a local maximum, the optimization starts independently from the one or more positions $(x_i, y_i)$ provided by the coarse alignment stage and ends up with a corresponding number of registrations candidates. The similarity measure is calculated between image pairs as above in the coarse alignment stage. One or more candidates with the largest similarity measure are selected from the candidates as the starting position for the final stage.

In a final stage according to an embodiment of the invention, a rigid-body transformation comprising three translations and three rotations are estimated starting from the starting positions of the candidates provided by the refinement stage. The one with the largest similarity measure is then selected as the final registration result.

Figure 7:
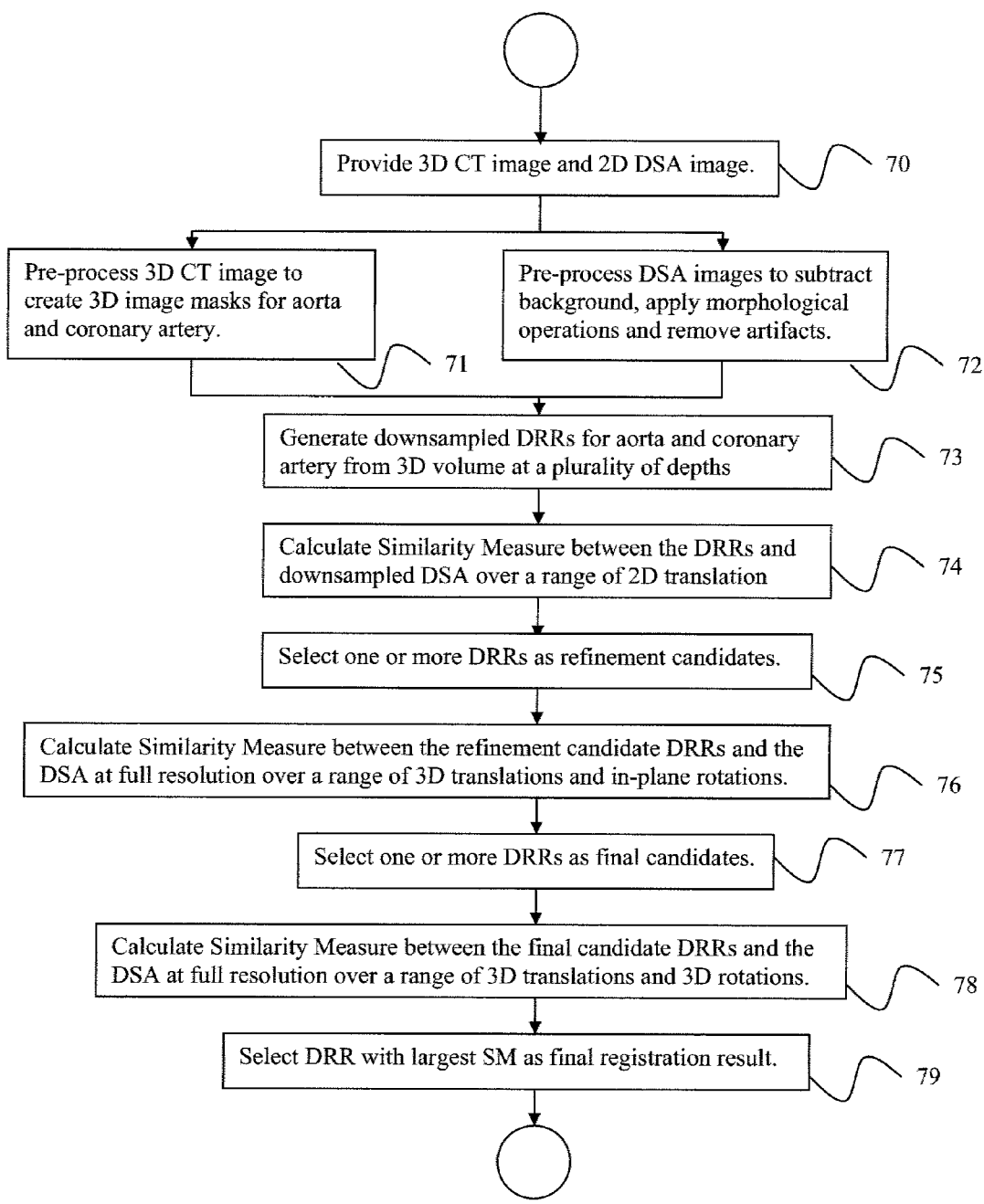
FIG. 7 is a flowchart of an algorithm for 2-dimension (2-D)/3-dimension (3-D) registration between 3-D image volumes and 2-D angiography images, according to an embodiment of the invention.

A flowchart of a method for 2-dimension (2-D)/3-dimension (3-D) registration between 3-D image volumes and 2-D angiography images according to an embodiment of the invention is depicted in FIG. 7. Referring now to the figure, a method according to an embodiment of the invention begins at step 70 by providing a 3-D CT image volume and a 2-D DSA X-ray fluoroscopy image. The 3-D image volume and the 2-D DSA image may be pre-processed simultaneously. At step 71, the 3D CT image volume is preprocessed to segment the aorta to produce a 3-D aorta mask image, and to produce a 3-D coronary mask image, as described above in connection with FIG. 6. 2-D DRRs of the aorta and the coronary artery may now be generated from the 3D CT volume using the respective image masks. At step 72, the 2-D DSA image is preprocessed to remove the background image, apply the morphological operations, and to filter out the artifacts of the morphological operations, as described above. At step 73, a plurality of downsampled DRRs of differing resolution are each separately generated for the aorta and the coronary artery from a plurality of depths in the 3D CT image volume, and the center of the aorta root is estimated in the DRRs.

In the coarse alignment stage, the similarity measure is calculated at step 74 between the aorta DRR image $I_{Aorta}$ and the DSA image $I_{DSA}$ using the aorta image mask $M_{Aorta}$, and between the coronary DRR image $I_{Coronary}$ and the DSA image $I_{DSA}$ using the coronary image mask $M_{Coronary}$, for a plurality of poses that search a 2-D translation space about the aorta center for each of the plurality of depths. At step 75, a plurality of DRR/pose combinations with an associated 2-D point (x,y) with the largest similarity measures are selected as refinement candidates for the next stage.

In the refinement stage, full resolution DRRs for the plurality of refinement candidates for the aorta and coronary artery are compared, at step 76, with the 2-D DSA to calculate the similarity measure for a plurality of poses that searches a 3-D translation space and in-plane rotation space about the refinement candidate point returned by the coarse alignment stage. At step 77, a plurality of DRR/pose combinations with an associated 3-D point and rotation angle with the largest similarity measures are selected as final candidates for the next stage.

In the final stage, full resolution DRRs for the plurality of final candidates for the aorta and coronary artery are compared, at step 78, with the 2-D DSA to calculate the similarity measure for a plurality of poses that searches a 3-D translation space and 3-D rotation space about the final candidate points returned by the refinement stage. At step 79, the DRR and pose with the largest similarity measures is selected as the final registration result.

Results

A 2-D/3-D Registration method according to an embodiment of the invention was tested on nine patients' data acquired during TAVI procedures on a Siemens AXIOM Artis C-arm system. Left coronary ostia and the left and right hinge points (the lowest points of the aortic leaflets), are automatically detected in 3-D volumes and manually annotated in 2-D fluoroscopes to evaluate the registration accuracy. FIG. 10 shows the Left coronary ostia 101 and the left and right hinge points 102. The accuracy is measured as the distance between projected landmarks after registration and the manually annotated ground truth on 2-D fluoroscopy. While rigid-body registration is needed in order to handle out-of-plane rotation, performance evaluation on a 2-D plane is appropriate for TAVI procedures, because the C-ARM angulation does not change after the optimal angle is selected, and the most important guidance is the landmarks (i.e. the ostia and hinge points) on the optimal projection. Examples of registration result are shown in FIG. 8.

A method according to an embodiment of the invention is compared with a conventional intensity based 2-D/3-D registration method, where the original fluoroscopic image and 3-D volume are used without preprocessing, and the DRR image is generated from the original 3-D volume. The same hierarchical registration strategy and the same similarity measure were used for a fair comparison. A registration is considered to be successful if the error is less than 5 pixels, and the results are summarized in the table of FIG. 9. In particular, the table presents results for the hinge plane distance, the ostia distance, and the average distance, for both a proposed registration method according to an embodiment of the invention and a conventional intensity based registration method. In addition, the angles between the lines connecting the two hinge points after registration and that from annotations is are also calculated, and are found to be as small as 3.9 degrees on average for a method according to an embodiment of the invention. This is an important measurement because it is critical for the implanted prosthesis to be coaxial to a patients' natural valve.

Experiments on clinical data from nine patients show that compared to a conventional intensity-based 2-D/3-D registration method, a method according to an embodiment of the invention increases the number of successful cases from 4 to 9, and reduces the average projection error from ~33 pixels to ~2 pixels, in a 256×256 image.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 11:
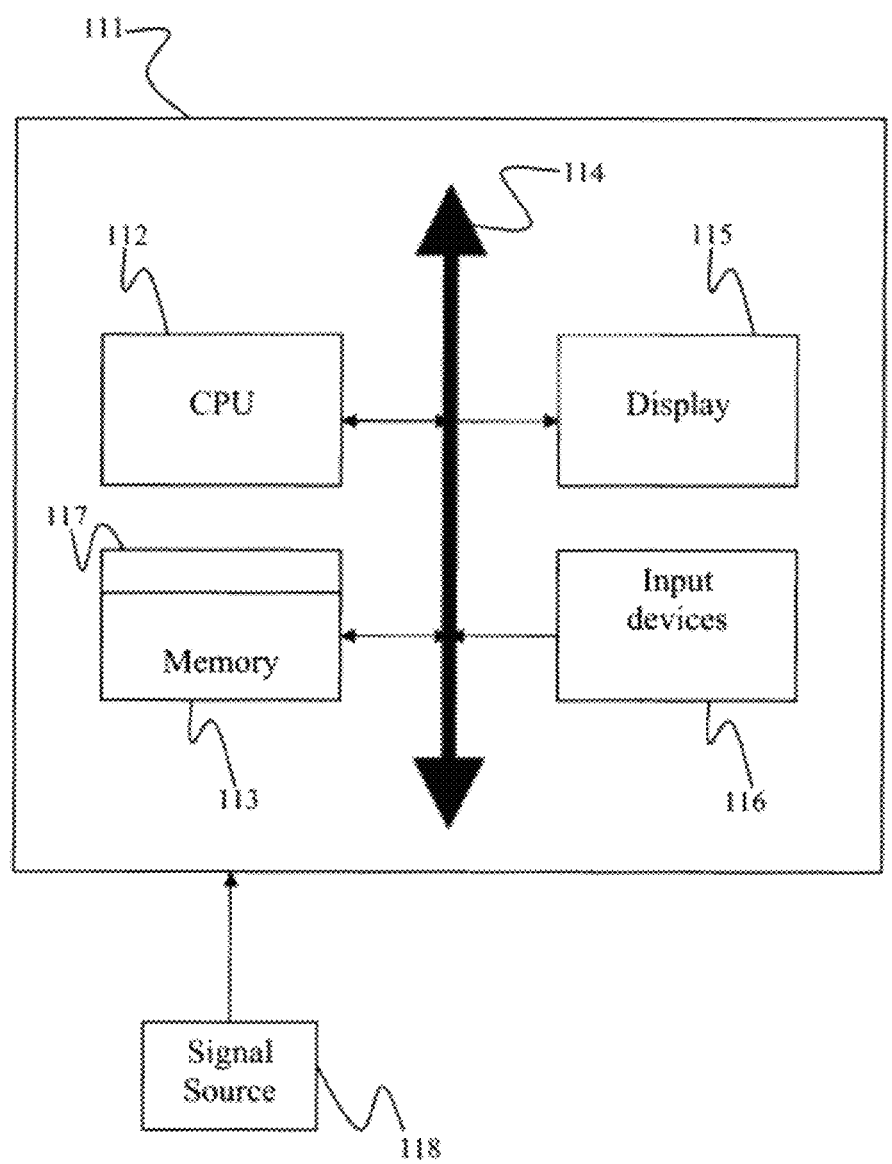
FIG. 11 is a block diagram of an exemplary computer system for implementing a method for 2-dimension (2-D)/3-dimension (3-D) registration between 3-D image volumes and 2-D angiography images, according to an embodiment of the invention.

FIG. 11 is a block diagram of an exemplary computer system for implementing a method for 2-dimension (2-D)/3-dimension (3-D) registration between 3-D image volumes and 2-D angiography images, according to an embodiment of the invention. Referring now to FIG. 11, a computer system 111 for implementing the present invention can comprise, inter alia, a central processing unit (CPU) 112, a memory 113 and an input/output (I/O) interface 114. The computer system 111 is generally coupled through the I/O interface 114 to a display 115 and various input devices 116 such as a mouse and a keyboard. The support circuits can include circuits such as cache, power supplies, clock circuits, and a communication bus. The memory 113 can include random access memory (RAM), read only memory (ROM), disk drive, tape drive, etc., or a combinations thereof. The present invention can be implemented as a routine 117 that is stored in memory 113 and executed by the CPU 112 to process the signal from the signal source 118. As such, the computer system 111 is a general purpose computer system that becomes a specific purpose computer system when executing the routine 117 of the present invention.

The computer system 111 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for registering a 2-dimensional digital subtraction angiography (DSA) image to a 3-dimensional image volume during a cardiac procedure, comprising the steps of:

calculating a coarse similarity measure between a 2-dimensional digitally reconstructed radiograph (DRR) of an aorta and a cardiac DSA image, and a 2-dimensional DRR of a coronary artery and the cardiac DSA image, for a plurality of poses over a range of 2-dimensional translations;

selecting one or more DRR-pose combinations for the aorta and the coronary artery with largest similarity measures as refinement candidates;

calculating the similarity measure between the refinement candidate DRRs of the aorta and the DSA, and between the refinement candidate DRRs of the coronary artery and the DSA, for a plurality of poses over a range of 3-dimensional translations and in-plane rotations;

selecting one or more DRR-pose combinations for the aorta and the coronary artery with largest similarity measures as final candidates;

calculating the similarity measure between the final candidate DRRs of the aorta and the DSA, and between the final candidate DRRs of the coronary artery and the DSA, for a plurality of poses over a range of 3-dimensional translations and 3-dimensional rotations; and selecting a DRR-pose combination with a largest similarity measure as a final registration result.

2. The method of claim 1, further comprising pre-processing the DSA image to subtract a background image, apply morphological operations, and remove artifacts of the morphological operations.

3. The method of claim 1, wherein the DRR of an aorta and the DRR of a coronary artery are generated from a same 3-dimensional cardiac image volume.

4. The method of claim 3, further comprising pre-processing the cardiac image volume to create 3-dimensional image masks for the aorta and the coronary artery, wherein said image masks are used to generate the DRR of the aorta and the DRR of the coronary artery.

5. The method of claim 3, wherein the DRR of an aorta and the DRR of a coronary artery are generated for a plurality of poses at a plurality of depths in the cardiac image volume.

6. The method of claim 5, wherein the DRR of an aorta and the DRR of a coronary artery are centered about an estimated center of the aortic root.

7. The method of claim 1, wherein the coarse similarity measure is calculated between a downsampled 2-dimensional DRR of the aorta, a downsampled 2-dimensional DRR of the coronary artery, and a downsampled cardiac DSA image.

8. The method of claim 1, wherein the similarity measure is defined by $$SM = GC_{Aorta}(I_{Aorta}, I_{DSA}, M_{Aorta}) + \beta \cdot GC_{Coronary}(I_{Coronary}, I_{DSA}, M_{Coronary})$$

wherein $I_{Aorta}$ represents the aortic DRR image, $I_{Coronary}$ represents the coronary artery DRR image, $I_{DSA}$ represents the DSA image, $M_{Aorta}$ represents a 2-dimensional aorta image mask defined as $$M_{Aorta} = \begin{cases} 1, & \text{if } |\nabla I_{Aorta}| > \alpha, \\ 0, & \text{otherwise}, \end{cases}$$

where $\alpha$ is a threshold of the image gradient, $M_{Coronary}$ represents a 2-dimensional coronary artery image mask defined as $$M_{Coronary} = \begin{cases} 1, & \text{if } \min(|\nabla I_{Coronary}|, |\nabla I_{DRR}|) > \alpha, \\ 0, & \text{otherwise}, \end{cases}$$

$\beta$ is a heuristically determined weight for coronary ostia landmark features, GC is a gradient correlation between images $I_1$ and $I_2$ with image mask M defined as $$GC(I_1, I_2, M) = NCC\left(\frac{\partial I_1}{\partial x}, \frac{\partial I_2}{\partial x}, M\right) + NCC\left(\frac{\partial I_1}{\partial y}, \frac{\partial I_2}{\partial y}, M\right),$$

and NCC denotes the normalized cross correlation of the masked images defined as $$NCC(I_1, I_2, M) = \frac{\sum_{M(x,y)=1} |I_1(x,y) - \bar{I}_1(x,y)||I_2(x,y) - \bar{I}_2(x,y)|}{\sqrt{\left(\sum_{M(x,y)=1} |I_1(x,y) - \bar{I}_1(x,y)||I_2(x,y) - \bar{I}_2(x,y)|\right)^2}},$$

wherein $\bar{I}$ denotes the average intensity of pixels in the masked region of the image.

9. The method of claim 4, wherein pre-processing the cardiac image volume to create 3-dimensional image masks for the aorta comprises:

segmenting the aorta in the cardiac image volume; and defining the aortic mask by $$VM_{aorta}(x,y,z) = \begin{cases} 1, & \text{if } (x,y,z) \in \text{aorta}, \\ 0, & \text{otherwise}, \end{cases}$$

10. The method of claim 9, wherein pre-processing the cardiac image volume to create 3-dimensional image masks for the coronary artery comprises:

detecting left and right coronary ostia in the cardiac image volume;

centering two spherical masks $VM_l$ and $VM_r$ around the detected coronary ostia;

forming a mask $VM_{out}$ from the union of $VM_l$ and $VM_r$, excluding an area inside $VM_{aorta}$ and calculating an intensity distribution for voxels in the mask $VM_{out}$; and choosing a lower bound of a volume transfer window associated with the coronary artery image mask as a given percentile of the intensity distribution, and an upper bound of the volume transfer window to be a highest voxel intensity of the volume.

11. A method for registering a 2-dimensional fluoroscopy image to a 3-dimensional image volume during a cardiac procedure, comprising the steps of:

providing a 3-dimensional cardiac image volume and a 2-D cardiac fluoroscopy image;

generating a plurality of 2-dimensional DRRs of an aorta and a plurality of 2-dimensional DRRs of a coronary artery at a plurality of depths from the cardiac image volume;

calculating the similarity measure between the aorta DRR and the DSA, and between the coronary artery DRR and the DSA, for a plurality of poses; and selecting a DRR-pose combination with a largest similarity measure as a registration result, wherein the similarity measure is defined by $$SM = GC_{Aorta}(I_{Aorta}, I_{DSA}, M_{Aorta}) + \beta \cdot GC_{Coronary}(I_{Coronary}, I_{DSA}, M_{Coronary})$$

wherein $I_{Aorta}$ represents the aortic DRR image, $I_{Coronary}$ represents the coronary artery DRR image, $I_{DSA}$ represents the DSA image, $M_{Aorta}$ represents a 2-dimensional aorta image mask defined as $$M_{Aorta} = \begin{cases} 1, & \text{if } |\nabla I_{Aorta}| > \alpha, \\ 0, & \text{otherwise}, \end{cases}$$

where $\alpha$ is a threshold of the image gradient, $M_{Coronary}$ represents a 2-dimensional coronary artery image mask defined as $$M_{Coronary} = \begin{cases} 1, & \text{if } \min(|\nabla I_{Coronary}|, |\nabla I_{DRR}|) > \alpha, \\ 0, & \text{otherwise}, \end{cases}$$

$\beta$ is a heuristically determined weight for coronary ostia landmark features, GC is a gradient correlation between images $I_1$ and $I_2$ with image mask M defined $$\text{as } GC(I_1, I_2, M) = NCC\left(\frac{\partial I_1}{\partial x}, \frac{\partial I_2}{\partial x}, M\right) + NCC\left(\frac{\partial I_1}{\partial y}, \frac{\partial I_2}{\partial y}, M\right),$$

and NCC denotes the normalized cross correlation of the masked images defined as $$NCC(I_1, I_2, M) = \frac{\sum_{M(x,y)=1} |I_1(x,y) - \bar{I}_1(x,y)||I_2(x,y) - \bar{I}_2(x,y)|}{\sqrt{\left(\sum_{M(x,y)=1} |I_1(x,y) - \bar{I}_1(x,y)||I_2(x,y) - \bar{I}_2(x,y)|\right)^2}},$$

wherein $\bar{I}$ denotes the average intensity of pixels in the masked region of the image.

12. The method of claim 11, wherein calculating the similarity measure between the aorta DRR and the DSA, and between the coronary artery DRR and the DSA, for a plurality of poses comprises:
   calculating the similarity measure between downsampled aortic DRRs and a downsampled cardiac DSA image, and downsampled coronary artery DRRs and a downsampled cardiac DSA image, for a plurality of poses over a range of 2-dimensional translations;
   selecting one or more DRR-pose combinations for the aorta and the coronary artery with largest similarity measures as refinement candidates;
   calculating the similarity measure between the refinement candidate aortic DRRs and the DSA, and between the refinement candidate coronary artery DRRs and the DSA, for a plurality of poses over a range of 3-dimensional translations and in-plane rotations;
   selecting one or more DRR-pose combinations for the aorta and the coronary artery with largest similarity measures as final candidates;
   calculating the similarity measure between the final candidate aortic DRRs and the DSA, and between the final candidate coronary artery DRRs, for a plurality of poses over a range of 3-dimensional translations and 3-dimensional rotations; and
   selecting a DRR-pose combination with a largest similarity measure as a final registration result.

13. A non-transitory program storage device readable by a computer, tangibly embodying a program of instructions executable by the computer to perform the method steps for registering a 2-dimensional digital subtraction angiography (DSA) image to a 3-dimensional image volume during a cardiac procedure, the method comprising the steps of:
   calculating a coarse similarity measure between a 2-dimensional digitally reconstructed radiograph (DRR) of an aorta and a cardiac DSA image, and a 2-dimensional DRR of a coronary artery and the cardiac DSA image, for a plurality of poses over a range of 2-dimensional translations;
   selecting one or more DRR-pose combinations for the aorta and the coronary artery with largest similarity measures as refinement candidates;
   calculating the similarity measure between the refinement candidate DRRs of the aorta and the DSA, and between the refinement candidate DRRs of the coronary artery and the DSA, for a plurality of poses over a range of 3-dimensional translations and in-plane rotations;
   selecting one or more DRR-pose combinations for the aorta and the coronary artery with largest similarity measures as final candidates;
   calculating the similarity measure between the final candidate DRRs of the aorta and the DSA, and between the final candidate DRRs of the coronary artery and the DSA, for a plurality of poses over a range of 3-dimensional translations and 3-dimensional rotations; and
   selecting a DRR-pose combination with a largest similarity measure as a final registration result.

14. The computer readable program storage device of claim 13, the method further comprising pre-processing the DSA image to subtract a background image, apply morphological operations, and remove artifacts of the morphological operations.

15. The computer readable program storage device of claim 13, wherein the DRR of an aorta and the DRR of a coronary artery are generated from a same 3-dimensional cardiac image volume.

16. The computer readable program storage device of claim 15, the method further comprising pre-processing the cardiac image volume to create 3-dimensional image masks for the aorta and the coronary artery, wherein said image masks are used to generate the DRR of the aorta and the DRR of the coronary artery.

17. The computer readable program storage device of claim 15, wherein the DRR of an aorta and the DRR of a coronary artery are generated for a plurality of poses at a plurality of depths in the cardiac image volume.

18. The computer readable program storage device of claim 17, wherein the DRR of an aorta and the DRR of a coronary artery are centered about an estimated center of the aortic root.

19. The computer readable program storage device of claim 13, wherein the coarse similarity measure is calculated between a downsampled 2-dimensional DRR of the aorta, a downsampled 2-dimensional DRR of the coronary artery, and a downsampled cardiac DSA image.

20. The computer readable program storage device of claim 13, wherein the similarity measure is defined by $$SM = GC_{Aorta}(I_{Aorta}, I_{DSA}, M_{Aorta}) + \beta \cdot GC_{Coronary}(I_{Coronary}, I_{DSA}, M_{Coronary})$$

wherein $I_{Aorta}$ represents the aortic DRR image, $I_{Coronary}$ represents the coronary artery DRR image, $I_{DSA}$ represents the DSA image, $M_{Aorta}$ represents a aorta image mask defined as $$M_{Aorta} = \begin{cases} 1, & \text{if } |\nabla I_{Aorta}| > \alpha, \\ 0, & \text{otherwise,} \end{cases}$$

where $\alpha$ is a threshold of the image gradient, $M_{Coronary}$ represents a coronary artery image mask defined as $$M_{Coronary} = \begin{cases} 1, & \text{if } \min(|\nabla I_{Coronary}|, |\nabla I_{DRR}|) > \alpha, \\ 0, & \text{otherwise,} \end{cases}$$

$\beta$ is a heuristically determined weight for coronary ostia landmark features, GC is a gradient correlation between images $I_1$ and $I_2$ with image mask M defined $$\text{as } GC(I_1, I_2, M) = NCC\left(\frac{\partial I_1}{\partial x}, \frac{\partial I_2}{\partial x}, M\right) + NCC\left(\frac{\partial I_1}{\partial y}, \frac{\partial I_2}{\partial y}, M\right),$$

and NCC denotes the normalized cross correlation of the masked images defined as $$NCC(I_1, I_2, M) = \frac{\sum\limits_{M(x,y)=1} |I_1(x, y) - \bar{I}_1(x, y)||I_2(x, y) - \bar{I}_2(x, y)|}{\sqrt{\left(\sum\limits_{M(x,y)=1} |I_1(x, y) - \bar{I}_1(x, y)||I_2(x, y) - \bar{I}_2(x, y)|\right)^2}},$$

wherein $\bar{I}$ denotes the average intensity of pixels in the masked region of the image.

21. The computer readable program storage device of claim 16, wherein pre-processing the cardiac image volume to create 3-dimensional image masks for the aorta comprises:
   segmenting the aorta in the cardiac image volume; and
   defining the aortic mask by $$VM_{aorta}(x, y, z) = \begin{cases} 1, & \text{if } (x, y, z) \in \text{aorta}, \\ 0, & \text{otherwise}, . \end{cases}$$

22. The computer readable program storage device of claim 21, wherein pre-processing the cardiac image volume to create 3-dimensional image masks for the coronary artery comprises:
   detecting left and right coronary ostia in the cardiac image volume;
   centering two spherical masks $VM_l$ and $VM_r$ around the detected coronary ostia;
   forming a mask $VM_{out}$ from the union of $VM_l$ and $VM_r$, excluding an area inside $VM_{aorta}$, and calculating an intensity distribution for voxels in the mask $VM_{out}$; and
   choosing a lower bound of a volume transfer window associated with the coronary artery image mask as a given percentile of the intensity distribution, and an upper bound of the volume transfer window to be a highest voxel intensity of the volume.

* * * * *